(12) United States Patent
Rong

(10) Patent No.: US 7,280,481 B2
(45) Date of Patent: Oct. 9, 2007

(54) SHORTEST PATH SEARCH METHOD "MIDWAY"

(76) Inventor: Guangyi David Rong, P.O. Box 962, Union City, CA (US) 94587

( * ) Notice: Subject to any disclaimer, the term of this patent is extended or adjusted under 35 U.S.C. 154(b) by 912 days.

(21) Appl. No.: 10/269,749

(22) Filed: Oct. 10, 2002

(65) Prior Publication Data
US 2004/0073702 A1    Apr. 15, 2004

(51) Int. Cl.
*H04L 1/00* (2006.01)
(52) U.S. Cl. ............ 370/238; 370/256; 709/238; 709/241
(58) Field of Classification Search ......... 370/218, 370/231, 235, 236, 254, 256, 329, 375, 389, 370/459, 503, 229, 230, 238, 255; 709/238, 709/241, 240, 242
See application file for complete search history.

(56) References Cited

U.S. PATENT DOCUMENTS

| | | | | |
|---|---|---|---|---|
| 4,597,076 | A * | 6/1986 | Bingham et al. | 370/375 |
| 4,905,233 | A * | 2/1990 | Cain et al. | 370/237 |
| 5,596,719 | A * | 1/1997 | Ramakrishnan et al. | 709/241 |
| 6,522,630 | B1 * | 2/2003 | Ooms et al. | 370/238 |
| 6,813,272 | B1 * | 11/2004 | An et al. | 370/238 |
| 6,990,075 | B2 * | 1/2006 | Krishnamurthy et al. | 370/236 |

OTHER PUBLICATIONS

Mesh Network Topological Optimization And Routing, IBM Technical Disclosure Bulletin, May 1991, vol. 33 p. 67-69.*
Tanenbaum, "Computer Networks," 1996, pp. 38-41, 3rd ed, Prentice Hall, Upper Saddle River, NJ, US.
Dijkstra, "A Note on Two Problems in Connexion with Graphs," Numerische Mathematik, 1959, pp. 269-271, vol. 1.
Aho et al. "The Design and Analysis of Computer Algorithms," 1976, pp. 207-208.
Norton et al., "Thread Time The Multithreaded Programming Guide," 1997, pp. 383-392.

* cited by examiner

*Primary Examiner*—Ricky Q. Ngo
*Assistant Examiner*—Pao Sinkantarakorn
(74) *Attorney, Agent, or Firm*—Davis Wright Tremaine LLP (57) ABSTRACT

A method of searching for a shortest path from a single source node to a single destination node in a two dimensional computer network. The method is similar to Dijkstra shortest path algorithm ("Dijkstra") in the way it builds a shortest path tree. However, instead of starting from the source node and searching through to the destination node as Dijkstra does, the method runs a shortest path search from both ends (i.e. source and destination) simultaneously or alternatively, until a shortest path tree from one end meets a shortest path tree from the other end at an intermediate node, and the concatenated path (source node intermediate node-destination node) satisfies a condition. Conditions other than those used by Dijkstra determine when the search should terminate, and whether the search has succeeded or failed. It has been verified that the new method requires less overhead and time than Dijkstra.

28 Claims, 1 Drawing Sheet

SHORTEST PATH SEARCH METHOD "MIDWAY"

BACKGROUND OF INVENTION

1. Field of the Invention

The said invention is applied to searching for a shortest path (with constraints) from a single source node to a single destination node in a flat computer network. The shortest path search function which implements this new method is used by the routing module running in a router of a packet (or cell) switching network or running in a switching node of a circuit switching network.

2. Description of the Related Art

A flat computer network (or each flat layer of a hierarchical network) consists of multiple number of nodes (i.e. dedicated purpose computers) connected by communication links, and forms a certain two dimensional topology. Each communication link is assigned a cost which is determined by considerations of application requirements [1]. When a packet (or cell) is to be sent or a circuit is to be built from a source node to a destination node in a network, it is required to find a shortest path among all available paths between the source and the destination. If all links in a network are assigned the same cost, the shortest path is a minimum hop path. If link costs are different, the shortest path is a minimum cost path. In the latter case the number of hops in a minimum cost path may exceed that in a minimum hop path.

The most popular method used by the current art to search for a shortest path is Dijkstra algorithm which may be a classic Dijkstra algorithm or an improved version of Dijkstra algorithm. Dijkstra algorithm has been described in many literatures [1] [3], and may be applied in two different cases.

1. To find shortest paths from a single source node to all other nodes in a network. Dijkstra algorithm makes a flood search and builds a shortest path tree with the source node as its root, and with all other nodes in the network as branch nodes or leave nodes of the tree. The search will terminate when all nodes in the network are linked up to the tree. The time complexity of Dijkstra algorithm in case 1 is $O(P_N^2)$ where $P_N$ is the total number of nodes in the network [4]. Dijkstra algorithm is efficient enough when applied in this case.

Figure 11:
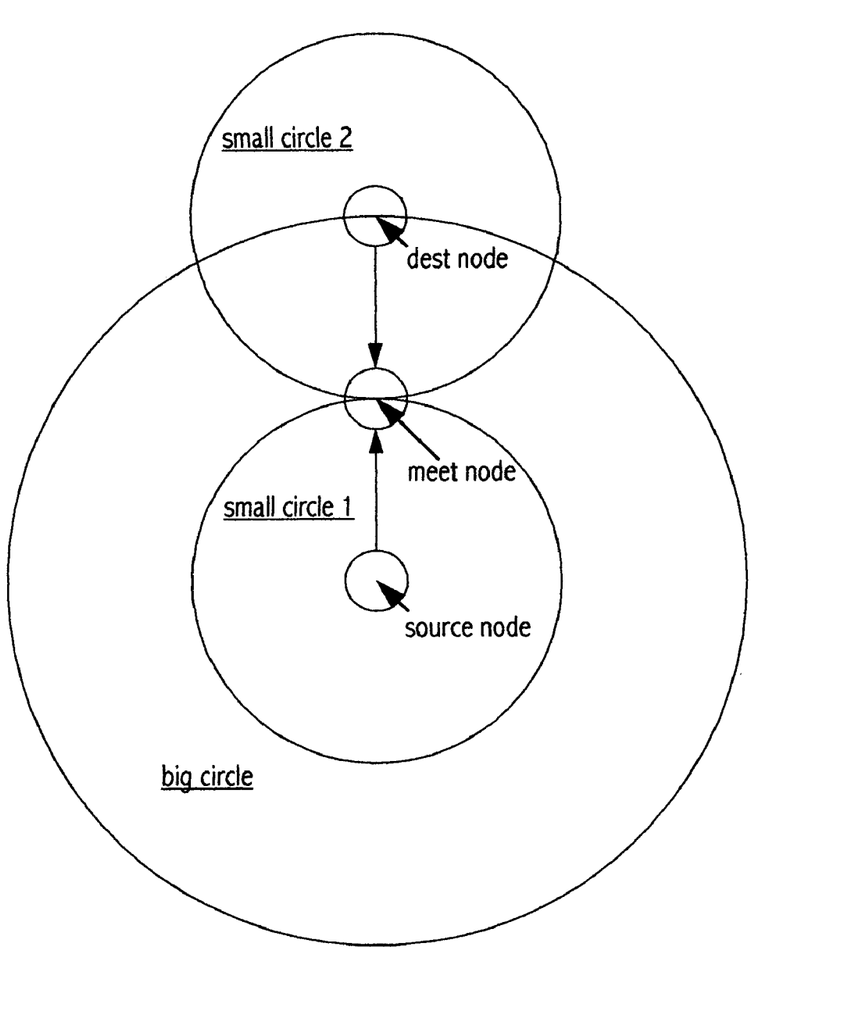

2. To find a shortest path from a single source node to a single destination node in a network. Dijkstra algorithm works in the same way as it does in case 1, but the search will terminate when the destination node is attached to the tree [2]. In this case Dijkstra algorithm also builds a shortest path tree with the source node as its root and a subset of the nodes in the network as branch nodes or leave nodes of the tree. The destination node is the last leave node being attached to the tree. In the case of searching for a minimum hop path this algorithm creates a minimum hop path tree. In the worst luck case it has to find all the minimum hop paths to all the nodes which are as far away as or less far away than the destination node from the source node (i.e. all the nodes lying in the searching range shown by the big circle in drawing sheet 1-1), even though it is only required to find one path to a single destination node. In the case of searching for a minimum cost path this algorithm builds a minimum cost path tree. In the worst luck case it has to find all the minimum cost paths from the source to all the nodes which are at the same cost away as or less cost away than the destination node from the source node (i.e. all the nodes lying in the big searching range circle shown by drawing sheet 1-1). In other words the problem of finding a shortest path (minimum hop or minimum cost path) from a single source to a single destination by Dijkstra algorithm is equivalent to the problem of finding all shortest paths from a single source node to all the nodes in a sub-network lying within the boundary of the big circle in sheet 1-1. The center of the big circle is the source node and the radius is the number of hops or the cost of the path from the source to the destination. Bear in mind that sheet 1-1 is a topology map rather than a geographic map. All hops or all equal cost paths are displayed by equal length straight lines, although they are not equal in length geographically. Hence, all nodes which are at the same hops away or at the same path cost away from the source node lie on the circumference of a circle. The time complexity of Dijkstra algorithm in case 2 is $O(P_D^2)$ where $P_D$ is the total number of nodes in the sub-network which includes all nodes in the big circle shown by sheet 1-1 [4].

Obviously Dijkstra algorithm is not efficient enough in case 2, as it has to find a large number of shortest paths which are not required while the purpose is to find only one shortest path from a single source to a single destination.

In a large high speed network the set up time of a shortest path from a single source to a single destination is a very important parameter, especially from the point of view of path switching on failure or preemption. The rerouting of a lot of connections that were using a failing or preempted link or node may lead to a high number of simultaneous new path set up and create a burst of processing overhead. In order to avoid disrupting the connections at the end user level in the above situation it is highly desirable to reduce both the overhead of a shortest path search algorithm and the shortest path set up time.

SUMMARY OF THE INVENTION

To make shortest path search more efficient and faster, a new search method "Midway" is invented. Instead of starting from the source node and searching all the way through to the destination node as the way Dijkstra algorithm works, Midway starts from both ends (i.e. source and destination) and runs shortest path search from both ends simultaneously or alternatively, until a shortest path tree from one end meets a shortest path tree from the other end at a "meet node" on midway (see sheet 1-1), and the concatenated path (source node-meet node-destination node) meets a certain condition. Hence the new algorithm is named "Midway". In comparison with Dijkstra, Midway algorithm drastically reduces the overhead in search of a shortest path by reducing the number of nodes being searched, and hence it can find a shortest path in much less time. In multiprocessor environment the two shortest path search processes (or threads) from both ends may run in parallel, and shortest path set up time will be further reduced. The implementation of the said new search method should minimize the additional code overhead required by doing shortest path search simultaneously or alternatively from both ends, and should define a new condition other than the condition used by Dijkstra to determine when the search should terminate. The implementation will be described in the detailed description part.

BRIEF DESCRIPTION OF THE DRAWING

Drawing sheet 1-1 shows a big circle which is the searching range of Dijkstra algorithm applied to searching for a shortest path from a single source node to a single destination node. It also shows two small circles which are searching ranges of Midway algorithm. One is the searching range of the search started from the source node while the other is that of the search started from the destination node. The two small circles touch at the meet node where two shortest paths meet.

DETAILED DESCRIPTION OF THE INVENTION

Comparison of Overhead (i.e. Complexity) Between Midway and Dijkstra Algorithms

To find a shortest path from a source node to a single destination node, the Dijkstra algorithm overhead is measured by $O(P_D^2)$ where $P_D$ is the number of nodes in the searching range shown by a big circle in sheet 1-1, while the Midway algorithm overhead is measured by $O(P_{M1}^2)$ plus $O(P_{M2}^2)$ where $P_{M1}$ is the number of nodes in small circle 1 and $P_{M2}$ is the number of nodes in small circle 2 (sheet 1-1). The number of nodes contained in a searching range (depicted by a circle) depends on the topology of the network and the area of the circle (i.e. square of the radius of the circle), and it grows rapidly with the radius which represents the total number of hops or total path cost of the shortest path. The diagram in sheet 1-1 shows that the meet node is in the middle of the shortest path, the small circle 1 radius approximately equals to the small circle 2 radius and equal to one half of the big circle radius. For a rough estimate, assume the network nodes are evenly distributed in the circle, so the number of nodes in a circle is proportional to the square of the radius of the circle. Hence it can be concluded that:

$$P_{M1}=P_{M2}=\tfrac{1}{2}P_D \text{ and}$$

$$O(P_{M1}^2)+O(P_{M2}^2)=2\times O(\tfrac{1}{16}P_D^2)$$

which means that overhead of Midway algorithm is approximately $\tfrac{1}{8}^{th}$ of that of Dijkstra algorithm. However, the above conclusion is just a rough estimate, and the actual reduction of overhead provided by Midway algorithm heavily depends on the network topology. The reduction of overhead by Midway algorithm is supported by simulation test results of the code implementing Midway algorithm.

Detailed Description of Midway Algorithm Implementation

Midway shortest path search algorithm may be implemented in different ways. In single processor environment shortest path search from both end nodes is executed in a single task and a single function by alternatively swapping pointers to two separate set of data structures, one for search from source node and the other for search from destination node. In multiprocessor environment shortest path search processes from source node and from destination node may be executed in parallel to further reduce shortest path set up time. In comparison to Dijkstra algorithm Midway requires some additional code overhead as it needs to do shortest path search from both source and destination nodes. In order to avoid the additional overhead from outweighing the benefit of Midway algorithm, the implementation should minimize the above mentioned code overhead. Detailed description of Midway algorithm is given in two parts, one for single processor environment and the other for multi-processor environment, and each part is further divided into two separate cases one for minimum cost path search and the other for minimum hop path search. The description illustrates how to do minimum cost or minimum hop search from both the source node and destination node simultaneously by multi-threading or multi-tasking, or alternatively in a single task and a single function, and how to determine a shortest path is found successfully or the path search fails. This also illustrates the essential difference between Dijkstra and Midway algorithms.

All sanity checks, check of link capabilities and other link parameters against path requirements (constraints), randomizing the order of nodes to be searched for link load balancing purpose, and other considerations required in practical application are omitted for clarity purpose.

Assumptions made:
1. The network is an undirected graph which means that if a link cost is assigned to a link between two nodes, the cost is same in both directions.
2. Link cost is always a positive value.
3. Valid node numbers are 1, 2, 3 . . . , MAXNODES.

Note: Midway algorithm also applies to directed graph network. In this case to build the backward search tree (see p. 8) the inward link cost should be used instead of using the outward link cost.

Definitions:

In order to make the description of the algorithm more readable the following terms are defined. (words in Italic font are defined terms)

Network topology map—an array (struct nodeInfo netMap[MAXNODES+1]) wherein MAXNODES equals to total number of nodes in the network, and its indexes are node numbers of nodes in the network (see header file midway.h). Each array element is a structure (struct nodeInfo) which contains two fields, number of neighbor nodes and a list of neighbor nodes. Each element of neighbor node list (struct neighborNode) contains fields of neighbor node number and link cost. (It may also contain fields of link capabilities, link state (blocked or not) or other link parameters which may be required in practical application, but they are not included here.) The network topology map structure should be updated by routing module periodically.

Shortest path—a minimum cost path or a minimum hop path as the case may be.

Forward search direction—search started from source node.

Backward search direction—search started from destination node.

Forward search tree—a shortest path search tree with source node as its root.

Backward search tree—a shortest path search tree with destination node as its root.

Current search direction tree—if current search direction is forward, it is forward search tree, otherwise it is backward search tree.

Opposite search direction tree—if current search direction is forward, it is backward search tree, otherwise it is forward search tree.

Searching node—a node from which to search for a shortest path by looking at all its neighbor nodes.

Neighbor node—a node which has a direct link to a searching node.

Searched node—the neighbor node which is currently being processed.

Node path cost—the total cost of the links in the path which connects this node to the root of the tree. (for minimum cost path only)

Node path hops—the total number of hops in the path which connects this node to the root of the tree.

Total path cost—the total cost of the links in a path which connects the source node to the destination node. (for minimum cost path only)

Total path hops—the total number of hops in a path which connects the source node to the destination node.

Path cost—may be used to denote node path cost or total path cost according to the context. (for minimum cost path only)

Path hops—may be used to denote node path hops or total path hops according to the context.

Path parameters—embodies path cost and path hops.

Path A is more expensive than path B—if path cost of A is greater than path cost of B or if path hops of A is greater than path hops of B when the two path costs are equal. (for minimum cost path only)

Path A is less expensive than path B—if path cost of A is less than path cost of B or if path hops of A is less than path hops of B when the two path costs are equal. (for minimum cost path only)

Path A is equally expensive as path B—if path cost of A is equal to path cost of B and path hops of A is equal to path hops of B. (for minimum cost path only)

Least cost leave node is a leave node whose path to the root node is not more expensive than the path of any other leave node to the root. (for minimum cost path only)

Leave node list—the leave nodes of the shortest path tree in each search direction are linked up in a double linked list which is sorted by the values of node path cost and node path hops of each leave node. The Least cost leave node is at the head of the linked list. (for minimum cost path only)

least cost branch is defined as the branch starting from the root node to the least cost leave node. (for minimum cost path only)

Candidate shortest path—a path that connects source node to destination node, and it is not more expensive than any other connecting paths found so far. (for minimum cost path only)

Single Processor Environment

Midway Minimum Cost Path Search Algorithm for SINGLE PROCESSOR SYSTEM

Function Name Midway_min_cost_sp

Description: To find a minimum cost path from a single source node to a single destination node. Search is processed from source node or destination node alternatively. This function creates two minimum cost path trees, one starts from source node as root, and the other starts from the destination node. A minimum cost path is found when the minimum cost path from the source node meets that from the destination and the concatenated path meets a certain condition.

Input:
1. Network topology map.
2. source node and destination node.
3. path requirement (path constraints) information should also be provided in practical application, but it is omitted here.

Output:
1. The minimum cost path
2. Total number of hops in the path
3. Total cost of the path.

The output information is only valid when return is SUCCESS.

Called by: routing module.

Return: SUCCESS or FAILURE;

Algorithm of Function Midway_min_cost_sp:
1. Initialize two identical sets of data structures. One set for forward search, and the other for backward search. (see attached header file "midway.h".)

Both the forward search tree structure and the backward search tree structure are created as a global two dimensional array defined as struct nodeTempInfo tree[2][MAXNODES+1] wherein MAXNODES equals to the total number of nodes in the network, and tree[0][j] is for forward search direction, tree[1][j] for backward search direction. The second index "j" in tree[i][j] is the node number of each node in the network. Each element of the array is a structure (struct nodeTempInfo) which contains fields of parent node number, node path cost and node path hops. Initialize the forward search tree structure by setting source node as its root as well as its only leave node, that is to set fields of tree [0][srcNode].parentNode equal to source node, node path cost and node path hops equal to "0". Initialize the backward search tree structure by setting destination node as its root as well as its only leave node, that is to set fields of tree[1][destNode].parentNode equal to destination node, node path cost and node path hops equal to "0". For the rest elements in the array tree[i][j] initialize parent node to "0", and node path cost as well as node path hops to INFINITY which is a very large number.

Initialize a global two dimensional array leave node list which is defined as struct node leaveCost[2][MAXNODES+1] to hold all leave nodes of the two search trees wherein leaveCost[0][j] is for leave nodes on forward search tree, and leaveCost[1][j] for those on backward search tree. The second index "j" in leaveCost[i][j] is the node number of each node in the network. Each element leaveCost[i][j] is a structure (struct node) which contains fields of prev and next. "prev" is the node ahead of node j in the sorted list, and "next" is the node following node j in the sorted list. Both forward and backward leave node lists are sorted lists with the least cost leave node at the head of each list. Initialize forward leave node list (leaveCost[0][ ]) by setting source node as the only leave node in the list, and initialize backward leave node list (leaveCost[1][ ]) by setting destination node as the only leave node in the list.

Declare a global data structure "struct meet_node meetNode", with fields "node" to hold the meet node number, "total_path cost" to hold the total path cost of the candidate shortest path, and "total_path_hops" to hold total path hops of the candidate path. Initialize node equal to "0", "total_path_cost" and "total_path_hops" to INFINITY.

2. Initialize global variable "Direction" equal to FORWARD (i.e. to start search from the source node first).

3. Entry of loop to build minimum cost path tree from source or destination node. Set pointers pointing to the appropriate set of data structures tree[ ][ ] and leaveCost[ ][ ] depending on search direction being FORWARD or BACKWARD.

4. Set searching node equal to the head node in the leave node list (i.e. the least cost leave node on the current search direction tree). First time entering this loop searching node is the root node of the said tree.
5. Pick the first neighbor node in neighbor node list of the searching node, and set the said neighbor node as searched node.
6. Entry of loop to Search all neighbor nodes of the searching node. If the searched node is the parent node of searching node on the current search direction tree, skip this node and go to step 17, otherwise go to next step.
7. Calculate new node path cost by adding node path cost of the searching node and the link cost from searching node to the searched node. Calculate new node path hops by adding 1 to node path hops of searching node.
8. If the said searched node is already a leave on the current search direction tree go to next step, otherwise go to step 10.
9. The searched node is already on the current search direction tree. Compare current node path parameters of the searched node with new path parameters. If current searched node path is more expensive than new path go to next step, otherwise leave the said searched node as is and go to step 17.
10. Now process the searched node. Initialize or update its path parameters by setting searched node path cost equal to new node path cost, and searched node path hops equal to new node path hops.
11. If the searched node is also a node on the opposite search direction tree (i.e. this is the new meet node of a new path linking the source node and destination node), go to next step, otherwise go to step 15.
12. The new path linking the two end nodes as mentioned in step 11 is given by concatenating the path from the source node to the new meet node and the path from the destination node to the new meet node. Calculate the new total path cost by adding the node path cost of the new meet node on the current search direction tree and its node path cost on the opposite search direction tree. Calculate the new total path hops by adding the node path hops of the new meet node on the current search direction tree and its node path hops on the opposite search direction tree. If there is no existing candidate shortest path, go to step 14; otherwise go to next step.
13. If there exists a candidate shortest path, compare the new path parameters with candidate path parameters. If candidate path is more expensive than new path, go to step 14, otherwise leave the existing candidate shortest path as is and go to step 15.
14. Set the new path as the candidate shortest path by setting meetNode.node equal to the new meet node, meetNode.total_path_cost equal to new total path cost and meetNode.total_path_hops equal to new total path hops.
15. If the searched node is already on the current search direction tree, go to next step; otherwise attach it to the said tree as a new leave node by attaching it to the link from the searching node (i.e. set its parent node equal to searching node), and insert it into the leave node list at an appropriate position sorted by its node path cost and node path hops, then go to step 17.
16. As the searched node is already on the current search direction tree, remove it from the said tree and attach it back to the tree by linking it to the searching node. In addition to that since its node path cost and node path hops on the current search direction tree have been reduced in step 10, readjust its position in the leave node list if its node path is less expensive than the node path of the leave node preceding it in the said list.
17. Get next neighbor node of the searching node. If there is no more next neighbor node go to next step; otherwise set searched node equal to next neighbor node and loop back to step 6.
18. All neighbor nodes of the searching node have been processed, so remove the searching node from the leave node list. The next searching node should be the head node in the updated leave node list (i.e. the least cost leave node on the updated current search direction tree). If next searching node is a valid node number, go to next step. If next searching node is not a valid node number, it means that the search process has exhausted all nodes in the network. In this case if there exists a candidate shortest path, it is the wanted minimum cost path and return SUCCESS; otherwise return FAILURE because it means that source node and destination node are not connected.
19. Reaching this step the next searching node is valid. If meetNode.node equals "0", go to step 20; otherwise meetNode.node is valid which means there exists a candidate shortest path. Then check the candidate shortest path to determine if it satisfies the condition of a qualified minimum cost path. First calculate the total path cost of a virtual minimum cost path by adding the path cost of the least cost branch on the forward search tree and the path cost of the least cost branch on the backward search tree, and also calculate the total path hops of a virtual minimum cost path by adding the path hops of the two least cost branches on the two above mentioned trees. Next compare the path parameters (i.e. path cost and path hops) of the virtual minimum cost path with those of the candidate shortest path to check the qualification condition whether the candidate shortest path is not more expensive than the virtual minimum cost path. If the above stated condition is TRUE, the candidate shortest path is identified to be the qualified minimum cost path, search is done, and return SUCCESS; otherwise go to next step.
20. Reaching this step there is no candidate shortest path or the condition stated in step 19 is not TRUE, and the next searching node is valid, switch search direction (i.e. switch search direction from FORWARD to BACKWARD or vice versa) and loop back to step 3 to continue search.

PROOF of the condition defined in step 19 to determine if a qualified minimum cost path is found:

When the condition defined in step 19 is true, the least cost leave node either on forward search tree or on backward search tree may or may not lie on a path connecting source node and destination node. If it does, the said connecting path must be equally expensive as or more expensive than the candidate shortest path. If it does not lie on any connecting path, it might reach one of the leave nodes on the opposite search direction tree in the subsequent rounds of search, and the connecting path thus created must be more expensive than that of the candidate shortest path. By exhausting all possible cases it can be concluded that there is no possibility to find a connecting path which is less expensive than the candidate shortest path.

Midway Minimum Hop Path Search Algorithm for SINGLE PROCESSOR SYSTEM

Function Name: Midway_min_hop_sp

Description: To find a minimum hop path from a single source node to a single destination node. Minimum hop path search function runs path search code from source or destination node alternatively depending on the value of search direction. Conditions to determine a minimum hop path being found in forward search direction:
1. forward search tree meets destination node, or
2. forward search tree meets backward search tree at a meet node.

Conditions to determine a minimum hop path being found in backward search direction:
1. backward search tree meets source node, or
2. backward search tree meets forward search tree at a meet node.

Input:
1. network topology map.
2. source node, destination node.
3. requirements of link capabilities should also be provided in practical application, but omitted here.

Output:
1. the minimum hop path.
2. the total number of hops in the path.

The returned information is valid only if return value is SUCCESS.

Called by: routing module.

Return: SUCCESS or FAILURE

Algorithm of Function Midway_min_hop_sp:
1. Create and Initialize two identical sets of data structures, one set for forward direction search and the other for backward direction search. (see header file midway.h)

The data structures and the initialization of the forward search tree and the backward search tree are exactly the same as those described in step 1 of algorithm Midway_min cost_sp.

For each search direction create two identical lists, one is searching node list to hold all searching nodes in each search direction and the other is searched node list to hold the nodes being searched by the searching node. Initialize source node as the only searching node in the forward searching node list (i.e. leaveHop_0[0][0].node=source node; leaveHop_0[0][0].next=NULL;), and initialize destination node as the only searching node in the backward searching node list (i.e. leaveHop_0[1][0].node=destination node; leaveHop_0[1][0].next=NULL;). leaveHop_0[ ][ ] and leaveHop_1[ ][ ] serve to hold the searching node list and searched node list alternatively. (see arrays leaveHop_0[ ][ ], leaveHop_1[ ][ ] in midway.h).

Initialize global variables "hops[0]" and "hops[1]" to "0" where "hops[0]" is used to control the swapping of pointers to searching node list and searched node list in the forward search direction, while "hops[1]" is used for the same purpose in the backward search direction.

Set global variable Direction equal to FORWARD (i.e. to start search from the source node first).

2. Entry of the loop to build minimum hop path trees in forward or backward search direction alternatively. Set pointers pointing to appropriate set of data structures tree[ ][ ], leaveHop_0[ ][ ] and leaveHop_1[ ][ ] depending on current search direction being FORWARD or BACKWARD. If this is not the first time entering this loop, swap the pointers to searching node list and searched node list, so the searched nodes in the previous round become searching nodes in the current round, and the searching node list used in the previous round is cleared and ready to hold the searched nodes in the current round.

3. If searching node list is empty return FAILURE which means that source node and destination node are not connected, otherwise set searching node equal to the first node in searching node list, and go to next step.

4. Entry of the loop to process all nodes in the searching node list. Set searched node equal to the first neighbor node in the neighbor node list of the current searching node.

5. Entry of the loop to search all neighbor nodes of a searching node. If the searched node is already on the current search direction tree, skip this node and go to step 10, otherwise go to next step.

6. Process the searched node. Attach it on the current search direction tree by linking it to the searching node: Tree[Direction][searched_node].parentNode=searching_node; and update field "path-hops" of searched node:
tree[Direction][searched_node].pathHops=
tree[Direction][searching_node].pathHops+1;

7. If searched node equals target node (in forward search direction target node is destination node, and in backward search direction target node is source node) or if searched node is a leave node on the opposite search direction tree, this means that the searched node is the meet node on the wanted minimum hop path and go to next step; otherwise go to step 9.

8. The minimum hop path found in step 7 is given by concatenating the path from the source node to the meet node and the path from the meet node to the destination node, and the total path hops of the said minimum hop path is given by adding the node path hops of the meet node in forward search direction and that of the meet node in backward search direction. Return SUCCESS.

9. Attach searched node to the tail of the searched node list, and go to next step.

10. If the neighbor node list of the searching node is exhausted, go to next step; otherwise set searched node equal to the next neighbor node of the searching node, and loop back to step 5.

11. All neighbor nodes of the current searching node have been searched. Check the searching node list. If searching node list is exhausted, go to next step; otherwise set searching node equal to next node in the searching node list, and loop back to step 4.

12. Current searching node list is exhausted, switch search direction (switch search direction from FORWARD to BACKWARD or vice versa), increase hops[Direction] by 1, and loop back to step 2.—

—End of Single Processor part

Multi-Processor Environment

In multi-processor environment it is possible to take advantage of the power of parallel processing provided by multi-threading or multi-tasking to further reduce shortest path set up time. A method based on multi-threading is described in the following. If the operating system does not support multi-threading, multi-tasking is the second choice (in certain real time operating system multi-tasking is as efficient as multi-threading). The method based on multi-tasking should be very similar to that based on multi-threading and its description will not be given. Thread management, scheduling and synchronization (shared resources integrity protection) should be compliant to POSIX standard [5] and certain extensions supported by the operating system in use may also be adopted.

The process which runs the routing module code should do the following to create a Parallel Processing Environment. (All thread synchronization mechanisms mutexes, read write locks and condition variables created by routing process are process private objects.)

1. The Boss-Worker parallel programming model is applied to implement the shortest path search algorithm [6]. The initial thread of routing process creates a boss thread to run the main shortest path function, and creates two worker threads to run the forward and backward shortest path search functions.
2. The worker thread creation function pthread_create( ) passes a thread argument "int Direction" to the created thread. Direction is assigned FORWARD to one worker thread and BACKWARD to the other one. The worker thread with Direction FORWARD will create a forward search tree rooted at source node (i.e. the host node), while the worker thread with Direction BACKWARD will create a backward search tree rooted at the destination node.
3. Set system scheduling contention scope for the two worker threads equal to PTHREAD_SCOPE_SYSTEM to bind them to two kernel threads in a one to one map, and make sure they will run on two distinct processors to guarantee parallelism.
4. As shortest path searching is a real time job, the scheduling policy of the two worker threads should be SCHED_FIFO and their priority should be set to very high priority, so that they will be scheduled to run as soon as they get work and will not be preempted before the work is done. (If 3 and 4 are not supported by the operating system, other scheduling policy may be considered, but performance will be degraded.)
5. Create mutexes or read write locks to protect following shared data or data structures (see header file midway.h).
    "struct nodeTempInfo tree[2][MAXNODES+1]" in which forward search tree and backward search tree are created. (for both minimum cost and minimum hop path)
    "struct meet_node meetNode" (for minimum cost path)
    "unsigned short meetNode" (for minimum hop path)
6. Initialize condition variables condForward, condBackward and condBoss and declare condition predicates searchForward, search Backward and searchDone to coordinate synchronization between boss thread and worker threads. Each condition predicate should be protected by its associated mutex.
7. Define two user defined signal types SIGUSR1 and SIGUSR2 for inter-thread communication between two worker threads running in parallel to search for a shortest path from two opposite ends (source and destination). When one thread has found a shortest path, it will send a signal to the other thread notifying it to stop search. SIGUSR1 is to be sent to forward search worker thread by backward search worker thread, and SIGUSR2 is to be sent in the other way round. All threads in routing process should block the two user defined signal types except the two said worker threads. The forward search worker thread should accept SIGUSR1 and the backward search work thread should accept SIGUSR2. Install two signal handlers in signal structures (struct sigaction act1, act2;). Set act1.sa_handler equal to function pointer sig_handler1 and act2.sa_handler equal to function pointer sig_handler2. Algorithm of Signal handlers will be given following the description for function Min_cost_search.
8. Declare global array flagDone[2]. It is initialized to all zeros by function Midway_min_cost_mp or Midway_min_hop_mp. When flagDone[0] is set to "1" (TRUE), it is to notify forward search thread to stop search. When flagDone[1] is set to "1" (TRUE), it is to notify backward search thread to stop search. Array flagDone[2] is not a shared object. "flagDone[i]" is updated by sig_handler.
9. Whenever the boss thread gets a job request to find a shortest path from the source node (i.e. the host node) to a destination node, it runs function Midway_min_cost_mp for minimum cost path or function Midway_min hop_mp for minimum hop path. Either function being called will initialize working data structures and global variables in the process heap space to be used by the two worker threads and wake up the worker threads by signaling a condition variable.
10. The two worker threads need to access the structure of network topology map. As the access is "read only", it doesn't need thread synchronization. The boss thread is responsible for updating the network topology map, but the structure should be kept frozen while shortest path search is in progress, so there is no concurrent access conflict in this structure.

Midway Minimum Cost Path Search Algorithm for MULTI-PROCESSOR SYSTEM

The algorithm of boss thread function Midway_min_cost_mp and that of worker thread function Min_cost_search are described below.

Function Name Midway_min_cost_mp

Description: To find a minimum cost path from a single source node to a single destination node. This function activates two worker threads running simultaneously to create two minimum cost path trees, one starts from source node as root, and the other starts from the destination node as root. A minimum cost path is found when two minimum cost paths meet and the concatenated path meets a certain condition.

Input
1. Network topology map.
2. source node and destination node.
3. path requirement information (path constraints) should also be provided in practical application, but it is omitted here.

Output:
1. The minimum cost path, total number of hops in the path and total cost of the path.
2. or SEARCH FAILED.

Running in boss thread.

Algorithm of Function Midway_min_cost_mp:
1. Wait on job queue. The job request is either to update structure Network topology map (higher priority) or to find a shortest path. Whenever the boss thread gets a job request to find a shortest path (minimum cost path) from the source node (i.e. the host node) to a destination node, it will first initialize the following working data structures and global variables in the process heap space to be used by the two worker threads.

The data structures and initialization of forward search tree and backward search tree in array tree[ ][ ] are same as those described in step 1 of function Midway_min_cost_sp (p. 11). As they are shared objects and may subject to concurrent access, each must be protected by its own mutex or a read write lock.

The data structure and initialization of leave node lists in array leaveCost[ ][ ] are same as those described in step 1 of function Midway_min_cost_sp (p. 11). As they are not shared objects, there is no need to consider thread synchronization.

Structure "struct meet_node meetNode" is same as that described in Midway_min_cost_sp (p. 12). It is a shared object and should be protected by a mutex or read write lock.

Initialize condition variables condForward, condBackward and condBoss and condition predicates searchForward, searchBackward and search Done. Each condition predicate should be protected by its own associated mutex.

Zero out array flagDone[2]. This array is not a shared object.

Declare a shared variable "int retVal" to indicate function Min_cost_search return value is SUCCESS or FAILURE. It should be protected by a mutex.

Thread synchronization should be applied to access shared data and data structures. The lock and unlock operations will not be explicitly stated in the description of the algorithm to make the description more readable, but they should be implemented in the code.

2. Wake up forward search thread by setting predicate searchForward equal to TRUE and signaling condition variable condForward, and wake up backward search thread by setting predicate search Backward equal to TRUE and signaling condBackward.

3. Wait on condition variable condBoss, till the shortest path is found by the worker threads.

4. When one of the worker threads succeeds in finding a shortest path or fails, it will set return value "retVal" to SUCCESS or FAILURE, set predicate search Done equal to TRUE and signal condBoss to wake up boss thread. The boss thread being activated will continue to run and go to step 5.

5. Check shared variable "retVal". If it is SUCCESS, present the shortest path in the format of a list of nodes and the total path cost and total path hops of the path to the job requesting module, otherwise notify requesting module SEARCH FAILED. The way to get the result shortest path is to concatenate the path from the source node to the meet node by tracing back from tree[FORWARD][meet node] all the way to tree[FORWARD][source node] and the path from the meet node to the destination node by tracing back from tree[BACKWARD][meet node] all the way to tree[BACKWARD][destination node] where meet node is given by meetNode.node. "total path cost" and "total path hops" are given by meetNode.total_path_cost and meetNode.total_path_hops. Loop back to step 1.

Function Name Min_cost_search

Description: It creates a shortest path tree rooted at the source or destination node as the case may be. A minimum cost path is found when the shortest path tree created by it meets that from the opposite end node and the concatenated path meets a certain condition.

Input:
1. Network topology map.
2. source node and destination node.
3. path requirement information (path constraints) should also be provided in practical application, but it is omitted here.

Output:
1. The minimum cost path
2. Total number of hops in the path and total cost of the path
3. return variable "retVal" SUCCESS or FAILURE The output information is only valid when shared variable "retVal" is SUCCESS.

Activated by function Midway_min_cost_mp.

Running in worker thread.

Algorithm of Function Min_cost_search:
1. Entry of loop to wait for work i.e. to wait on condition variable condForward or condBackward depending on argument Direction being FORWARD or BACKWARD which is passed to it by thread creation function.
2. When boss thread function Midway_min_cost_mp signals the said condition variable, the worker thread is scheduled to run, and go to next step.
3. Set pointers pointing to the appropriate set of data structures tree[ ][ ] and leaveCost[ ][ ] of each thread depending on argument "Direction" being FORWARD or BACKWARD. In forward search direction the root node of the forward search tree is the given source node, and destination node is the given destination node, while in backward search direction the root of the backward search tree is the given destination node, and the destination node is the given source node.
4. Steps 4 through 17 are exactly the same as the corresponding steps in algorithm of Function Midway_min_cost_sp (see pp 12, 14).
18. Reaching this step all neighbor nodes of the searching node have been processed, so remove the searching node from the leave node list. Now check if the other worker thread has sent any signal by reading flagDone[Direction]. If the value is TRUE, it means that search should stop, break out of the loop started at step 4, and loop back to step 1, otherwise continue search. The next searching node should be the least cost leave node on the updated current search direction tree. If the next searching node is a valid node number, go to next step; otherwise go to step 20.
19. Reaching this step the next searching node is valid. If meetNode.node equals "0" which means there is no candidate shortest path, go to step 21; otherwise meetNode.node is valid which means there exists a candidate shortest path. Then check the candidate shortest path to determine if it satisfies the condition of a qualified minimum cost path. This condition is exactly the same as that described in step 19 of function Midway_min_cost_sp (see p. 14). If the above stated condition is TRUE, search is done, set shared variable "retVal" to SUCCESS, send a signal to the other worker thread to notify it to stop, set predicate searchDone to TRUE and signal condBoss to wake up boss thread, break out of the loop started at step 4, and loop back to step 1. If the qualified minimum cost path condition check fails, go to step 21.

20. Reaching this step there is no valid searching node number left. If there exists a candidate shortest path, it is the wanted shortest path and set shared variable "retVal" to SUCCESS, otherwise set "retVal" to FAILURE, as the latter condition means the source node and destination node are not connected. In both cases signal the other worker thread to stop, set predicate searchDone to TRUE, signal condBoss to wake up boss thread, break out of the loop started from step 4 and loop back to step 1.
21. Reaching this step either candidate shortest path doesn't exist, or the condition stated in step 19 is not TRUE and the next searching node is valid, so loop back to step 4 to continue search.

PROOF of the condition stated in step 19 is the same as the proof given in function Midway_min_cost_sp. (see p. 14)

Function Name: sig_handler1

Description: To handle the signal of type SIGUSR1 being sent to forward search worker thread to notify the said thread to stop search.

Algorithm of Function sig_handler1
  1. set flagDone[1] equal to TRUE.
  2. return;

Function Name: sig_handler2

Description: To handle the signal of type SIGUSR2 being sent to backward search worker thread to notify the said thread to stop search.

Algorithm of Function sig_handler2
  1. set flagDone[1] equal to TRUE.
  2. return;

Midway Minimum Hop Path Search Algorithm for MULTIPROCESSOR SYSTEM

Function Name Midway_min hop_mp

Description: To find a minimum hop path from a single source node to a single destination node. This function activates two worker threads running simultaneously to create two minimum hop path trees, one starts from source node as root, and the other starts from the destination node as root.

Conditions to determine a minimum hop path being found in forward search direction:
  1. forward search tree meets destination node, or
  2. forward search tree meets backward search tree at a meet node.

Conditions to determine a minimum hop path being found in backward search direction:
  1. backward search tree meets source node, or
  2. backward search tree meets forward search tree at a meet node.

Input:
  1. network topology map.
  2. source node, destination node.
  3. requirements of link capabilities (path constraints) should also be provided in practical application, but omitted here.

Output:
  1. the minimum hop path and the total number of hops in the path.
  2. or SEARCH FAILED.

Running in boss thread.

Algorithm of Function Midway_min_hop_mp:
  1. Wait on job request queue. The job request is either to update structure Network topology map (higher priority) or to find a shortest path. Whenever the boss thread gets a job request to find a shortest path (minimum hop path) from the source node (i.e. the host node) to a destination node, it will first initialize the following working data structures (two identical sets of data structures, one set for forward search direction and the other for backward search direction), and global variables in the process heap space to be used by the two worker threads.
     Initialization of the forward search tree and the backward search tree in array tree[ ][ ] and thread synchronization mechanism are exactly the same as those described in step 1 of algorithm Midway_min_cost_mp (see p. 21).
     Initialize searching node list and searched node list (leaveHop_0[ ][ ] and leaveHop_1[ ][ ]) in the same way as described in the corresponding bullet of step 1 in algorithm Midway_min_hop_sp (see p. 16). The two arrays are not shared objects
     Initialize global variables "hops[0]" and "hops[1]" in the same way as described in the corresponding bullet of step 1 in algorithm Midway_min_hop_sp (see p. 16). Array hops[2] is not a shared object.
     Initialize global variable "unsigned short meetNode" to "0" which is a shared object and should be protected by a mutex or a read write lock.
     Initialize global variable "unsigned short totPathHops" equal to "INFINITY". It is not a shared object.
     Initialize condition variables condForward, condBackward and condBoss which are not shared objects. Initialize condition predicates searchForward, searchBackward and searchDone which are shared objects and should be protected by their associated mutexes. Both condition variables and condition predicates are used to coordinate synchronization between boss thread and its two worker threads.
     Declare a shared variable "int retVal" to indicate function Min_hop_search return value is SUCCESS or FAILURE. It should be protected by a mutex.
     Zero out global array flagDone[2]. This array is not a shared object.
     Thread synchronization should be applied to access shared data and data structures. The lock and unlock operations will not be explicitly stated in the description of the algorithm to make the description more readable, but they should be implemented in the code.
  2. Wake up forward search thread by setting predicate searchForward to TRUE and signaling condition variable condForward, and wake up backward search thread by setting predicate searchBackward to TRUE and signaling condBackward.
  3. Wait on condition variable condBoss, till the shortest path is found by the worker threads.
  4. When one of the worker threads succeeds in finding a shortest path or fails, it will set its return value to SUCCESS or FAILURE, set predicate searchDone to TRUE and signal condBoss to wake up boss thread. The boss thread will go to next step.

5. Check the return value "retVal". If it is SUCCESS, present the shortest path in the format of a list of nodes and the total path hops of the shortest path to the job requesting module; otherwise notify requesting module SEARCH FAILED, and then loop back to step 1. The way to get the result shortest path is the same as that described in step 5 of algorithm Midway_min_cost_mp (p. 22). "total path hops" is given by adding the node path hops of the meet node on the forward search tree and that on the backward search tree:
totPathHops=tree[FORWARD][meetNode].pathHops+ tree[BACKWARD][meetNode].pathHops; (see midway.h)

Function Name Min_hop_search

Description: It creates a shortest path tree rooted at the source or destination node as the case may be. A minimum hop path is found when the shortest path tree created by it meets that from the opposite end node.

Input
1. Network topology map.
2. source node and destination node.
3. path requirement information (path constraints) should also be provided in practical application, but it is omitted here.

Output:
1. the meet node number and minimum hop path.
2. return variable "retVal" SUCCESS or FAILURE.

The output information is only valid when shared variable retVal is SUCCESS.

Activated by function Midway_min_hop_mp.

Running in worker thread.

Algorithm of Function Min_hop_search:
1. Entry of loop to wait for work. Wait on condition variable condForward or condBackward depending on argument Direction being FORWARD or BACKWARD which is passed to it by thread creation function. When boss thread function Midway_min hop_mp signals the said condition variable, the worker thread is activated. It should set predicate searchForward or searchBackward to FALSE, set pointers pointing to appropriate set of data structures tree[ ][ ],

```
/******************* midway.h *******************/
#define MAXNODES        250 /* maximum number of nodes allowed in a network */
#define MAXNEIGHBORS    8 /* maximum number of neighbor nodes of a node */
#define FORWARD         0
#define BACKWARD        1
#define INFINITY COST   0xffff
#define     INFINITY HOPS    0xff
#define SUCCESS         1
#define FAILURE    -1
typedef struct nodeTempInfo
{
    unsigned short      parentNode;   /* parent node in the shortest path tree */
    unsigned short      pathCost;     /* total path cost from the node to root */
    unsigned char       pathHops;     /* total path hops from the node to root */
} NODE TEMP INFO;
typedef struct neighborNode
{
    unsigned short      node;         /* neighbor node number */
    unsigned short      linkCost;     /* link cost to this neighbor node */
} NEIGHBOR NODE;
typedef struct nodeInfo
{
    unsigned short      nbors:        /* number of neighbor nodes */
    NEIGHBOR NODE       neighbors[MAXNEIGHBORS];
} NODE INFO;
NODE INFO           netMap[MAXNODES + 1]; /* array index = node number */
NODE TEMP INFO      tree[2][MAXNODES + 1]; /* second array index = node number */
/*********************************
tree[0] for forward search tree,
tree[1] for backward search tree.
*********************************/
int                 Direction, oppositeDirection:     /* FORWARD or BACKWARD */
unsigned short      srcNode, destNode:
#ifdef MINCOST
/******* For minimum cost path only **************/
tyredef struct meet node
{
    unsigned short      node;
    unsigned short      tot path cost;
    unsigned short      tot path hops;
} MEET NODE;
MEET NODE           meetNode:
tyredef struct node
{
    unsgned short      prev; /* index of next node in the array */
    unsgned short      next; /* index of previous node in the array */
} NODE;
NODEleaveCost[2][MAXNODES + 1];   /* second array index = node number */
/*********************************
```

-continued

```
leaveCost[0][ ] for forward search
leaveCost[1][ ] for backward search
*******************************************/
#endif
#ifdef MINHOP
/********* For minimum hop path only **************/
typedef struct node
{
    unsigned short      node; /* node number */
    struct node         *next; /* pointer to next node in the array */
} NODE:
NODE            leaveHop_0[2][MAXNODES + 1];
NODE            leaveHop_1[2][MAXNODES + 1];
/***************************************************
leaveHop_0[0][MAXNODES + 1] for forward search
leaveHop_0[1][MAXNODES + 1] for backward search
leaveHop_1[0][MAXNODES + 1] for forward search
leaveHop_1[1][MAXNODES + 1] for backward search
****************************************************/
unsigned char       hops[2];
unsigned short      totPathHops, meetNode;
#endif
/***************************************************
structures used by multi-threading are omitted.
They are compliant to POSIX standard.
****************************************************/
/*** END ***/
``` leaveHop_0[ ][ ] and leaveHop_1[ ][ ] depending on search direction being FORWARD or BACKWARD, and go to next step.

2. Entry of loop to build minimum hop path tree in forward or backward search direction. If this is not the first time entering this loop, swap the pointers to searching node list and searched node list, so the searched nodes in the previous round become searching nodes in the current round, and the searching node list used in the previous round is cleared and ready to hold the searched nodes in the current round.

3. If searching node list is empty, it means that source node and destination node are not connected, set return value "retVal" to FAILURE, send signal to notify the other worker thread to stop, set condition predicate "searchDone" to TRUE and signal condBoss to wake up boss thread, break out of the loop started from step 2, and loop back to step 1. If searching node list is not empty set searching node equal to the first element in searching node list, and go to next step.

4. Steps 4 through 7 are exactly the same as the corresponding steps in algorithm Midway_min_hop_sp (see p. 17).

8. Reaching this step the minimum hop path is found. Now first check if the other worker thread has sent any signal by reading flagDone[Direction]. If the value is TRUE, it means that this is a notification to stop search, break out of the loop started from step 2, and loop back to step 1; otherwise report search done by doing the following: Set shared variable meetNode equal to the meet node defined in step 7. Set return value "retVal" equal to SUCCESS. Send a signal to the other worker thread to notify it to stop search. Set condition predicate searchDone to TRUE and signal condition variable condBoss to wake up boss thread. Break out of the loop started at step 2, and loop back to step 1.

9. Attach searched node to the tail of the searched node list, and go to next step.

10. If the neighbor node list of the searching node is exhausted, go to next step, otherwise set searched node equal to the next neighbor node of the searching node, and loop back to step 5.

11. All neighbor nodes of the current searching node have been searched. Now check if the other worker thread has sent any signal by reading flagDone[Direction]. If the value is TRUE, it means that this is a notification to stop search, break out of the loop started from step 2, and loop back to step 1; otherwise continue to search. Check the searching node list. If searching node list is exhausted, go to next step, otherwise set searching node equal to next node in the searching node list, and loop back to step 4.

12. Current searching node list is exhausted, increase hops[Direction] by 1, and loop back to step 2. Notice that hops[Direction] is only used to control swapping of the pointers to searching node list and searched node list.

End of Multi-Processor part

I claim:

1. A method to search for a shortest path through a two dimensional computer network comprising a plurality of nodes, wherein the shortest path extends from a single source node of the plurality of nodes to a single destination node of the plurality of nodes, the method comprising performing a shortest path search from both the single source and the single destination node alternatively using a single task and a single function in a single processor environment, wherein the shortest path search comprises one of a minimum hop path search and a minimum cost path search having a plurality of rounds, each round being executed by the single processor using code, the same code being executed by the single processor each round, wherein performing the shortest path search comprises:

declaring two identical sets of data structures, a forward set of data structures for searching from the source node and a backward set of data structures for searching from the destination node, if the shortest path search comprises the minimum hop path search, each set of data structures comprises a minimum hop path tree having a plurality of branches, a plurality of leave nodes and a root node, the root node of the minimum hop path tree of the forward set of data structures comprising the source node and the root node of the minimum hop path tree of the backward set of data structures comprising the destination node, and if the shortest path search comprises the minimum cost path search, each set of data structures comprises a minimum cost path tree comprising a plurality of branches each having a path cost and path hops, and a plurality of leave nodes comprising a least cost leave node having a plurality of neighbor nodes, the plurality of branches comprising a least cost branch having a least path cost and a number of least path hops, the least path cost being less than the path cost of the other branches of the plurality of branches, and the least cost leave node being located at an end of the least cost branch;

declaring a set of pointers comprising a pointer to each data structure of one of the forward and backward sets of data structures;

swapping pointers to one of the forward and backward sets of data structures to the other after each round of the plurality of rounds of the shortest path search, if the shortest path search comprises the minimum cost path search, the minimum cost path tree of the pointed to sets of data structures is the current search direction tree and the minimum cost path tree of the other sets of data structures is the opposite search direction tree;

performing a round of the plurality of rounds of the shortest path search, until a certain condition is satisfied, if the shortest path search comprises the minimum hop path search, the round of the shortest path search comprises exhausting all leave nodes existing on the minimum hop path tree at the beginning of the round, if the shortest path search comprises the minimum cost path search, the round of shortest path search comprises exhausting all neighbor nodes of the least cost leave node of the current search direction tree, the method differing from Dijkstra's algorithm by inserting the leave nodes into a sorted double linked leave node list having a head, the least cost leave node being at the head of the leave node list, so the least cost leave node is ready for use in the next round, and using the current search direction tree to identify a candidate shortest path or determine a shortest path does not exist, wherein the certain condition comprises determining the shortest path search has succeeded or failed, the minimum hop path search determines the minimum hop path search has succeeded when a minimum hop path is successfully found by determining a leave node of the minimum hop path tree of one of the forward and backward sets of data structures meets a leave node of the minimum hop path tree of the other of the forward and backward sets of data structures, the minimum hop path search determines the minimum hop search has failed when the source and destination nodes are not connected, the minimum hop search determines the source and destination nodes are not connected by determining all of the leave nodes of the minimum hop path tree of one of the forward and backward sets of data structures have been looked up and no path linking the source node and the destination node was found, the minimum cost path search determines the minimum cost path search has failed when the source node and destination node are not connected, determining the source node and destination node are not connected comprising determining the leave node list of the current search direction tree is exhausted and the candidate shortest path was not identified, the minimum cost path search determines the minimum cost path search has succeeded when:

the candidate shortest path is identified, the candidate shortest path is identified when the least cost branch of the current search direction tree meets a leave node of the plurality of leave nodes of the opposite search direction tree, a concatenated path is identified, the concatenated path comprises the least cost branch of the current search direction tree and a branch of the opposite search direction tree comprising the leave node, and the candidate shortest path comprises the concatenated path if the concatenated path is the first one identified, if the concatenated path is not the first one identified, the candidate shortest path is replaced by the concatenated path if the concatenated path is less expensive than the candidate shortest path, and the candidate shortest path is determined to be the shortest path, the candidate shortest path is determined to be the shortest path when the candidate shortest path is identified and the leave node list is exhausted or if the leave node list is not exhausted, the candidate shortest path is determined to be the shortest path when the candidate shortest path is not more expensive than a virtual minimum cost path, wherein determining which of the candidate shortest path and the virtual minimum cost path is more expensive comprises:

calculating a total path cost of the virtual minimum cost path by adding the least path cost of the least cost branch of the current search direction tree and the least path cost of the least cost branch of the opposite search direction tree, calculating a number of total path hops of the virtual minimum cost path by adding the number of least path hops of the least cost branch of the current search direction tree and the number of least path hops of the least cost branch of the opposite search direction tree, calculating a candidate path cost and candidate path hops for the candidate shortest path, comparing the total path cost and the number of total path hops of the virtual minimum cost path with the candidate path cost and candidate path hops of the candidate shortest path; and determining the candidate shortest path is not more expensive than the virtual minimum cost path if the total path cost of the virtual minimum cost path is greater than the candidate path cost, or the total path cost of the virtual minimum cost path is equal to the candidate path cost and the number of total path hops of the virtual minimum cost path is greater than the candidate path hops.

2. A method of performing a shortest path search from a single source node to a single destination node in a two dimensional computer network, wherein the method takes advantage of the power of parallel processing provided by multi-threading or multi-tasking in a multi-processor environment to perform the shortest path search from both the source node and destination node simultaneously, the method, based on multithreaded programming compliant to a POSIX standard, comprising:

using a Boss-Worker parallel programming model comprising:

two worker threads comprising a forward worker thread for running a forward shortest path search function for building a forward shortest path tree and a backward worker thread for running a backward shortest path search function for building a backward shortest path tree, wherein the forward worker thread runs the forward shortest path search function on a first processor, the backward worker thread runs the backward shortest path search function on a second processor, and the first and second processors run in parallel, and a boss thread for running a shortest path search management function, the boss thread being created by a main thread of a routing process, wherein the boss thread creates and initializes global variables and data structures required by the two worker threads to run the forward shortest path search function and backward shortest path search function, a portion of the data structures are shared by the two worker threads, the boss thread creates mutexes or read write locks to synchronize concurrent access to the portion of the data structures shared by the two worker threads, the boss thread creates condition predicates, condition variables and their associated mutexes to coordinate synchronization between the boss thread and the two worker threads, the boss thread uses one set of condition predicates and condition variables to wake up one of the two worker threads while the worker thread is waiting for a shortest path search job, each of the two worker threads uses another set of condition predicates and condition variables to wake up the boss thread while it is waiting for the shortest path search job to be done, and the boss thread creates a communication means for the two worker threads to communicate with each other;

maintaining the two worker threads in a wait state wherein the two worker threads wait for the shortest path search job, when the boss thread identifies a need to find a shortest path through the network, the boss thread wakes up each of the two worker threads by signaling its condition variable, so the forward worker thread will start to run the forward shortest path search function to build the forward shortest path tree from the source node and the backward worker thread will start to run the backward shortest path search function to build the backward shortest path tree from the destination node simultaneously wherein a thread scheduling policy allows the forward worker thread to run the forward shortest path search function as soon as the forward worker thread is awoken by the boss thread, and the thread scheduling policy will not preempt the forward worker thread until the shortest path search job is completed, and the thread scheduling policy allows the backward worker thread to run the backward shortest path search function as soon as the backward worker thread is awoken by the boss thread, and the thread scheduling policy will not preempt the backward worker thread until the shortest path search job is completed;

maintaining the boss thread in a wait state to wait for the shortest path search to be done; and after one of the two worker threads has a result comprising successfully finding a shortest path or determining the shortest path search has failed, the worker thread stops searching, notifies the other worker thread to stop searching, and wakes up the boss thread to process the result of shortest path search.

3. A method of terminating a shortest path search for a shortest path and determining whether the shortest path search for the shortest path succeeded or failed, the shortest path comprising a path extending through a two dimensional computer network comprising a plurality of nodes, the path extending from a single source node to a single destination node, wherein the shortest path search searches for the shortest path from the single source node and single destination node alternately or simultaneously, and the shortest path search comprises one of a minimum hop path search and a minimum cost path search, if the shortest path search comprises the minimum hop path search, the minimum hop path search comprises constructing a forward minimum hop path tree having a plurality of leave nodes and a root node, the root node comprising the source node and constructing a backward minimum hop path tree having a plurality of leave nodes and a root node, the root node comprising the destination node, if the shortest path search comprises the minimum cost path search, the minimum cost path search comprises:

constructing a forward minimum cost path tree comprising a plurality of branches each having a path cost and path hops, and a plurality of leave nodes comprising a least cost leave node having a plurality of neighbor nodes, the plurality of branches comprising a least cost branch having a least path cost and a number of least path hops, the least path cost being less than the path cost of the other branches of the plurality of branches, and the least cost leave node being located at an end of the least cost branch;

constructing a backward minimum cost path tree comprising a plurality of branches each having a path cost and path hops, and a plurality of leave nodes comprising a least cost leave node having a plurality of neighbor nodes, the plurality of branches comprising a least cost branch having a least path cost and a number of least path hops, the least path cost being less than the path cost of the other branches of the plurality of branches, and the least cost leave node being located at an end of the least cost branch;

for the forward minimum cost path tree, constructing a corresponding leave node list comprising the plurality of leave nodes of the forward minimum cost path tree;

for the backward minimum cost path tree, constructing a corresponding leave node list comprising the plurality of leave nodes of the backward minimum cost path tree;

identifying a current search direction tree comprising one of the forward minimum cost path tree and backward minimum cost path tree;

identifying an opposite search direction tree comprising the other of the forward minimum cost path tree and backward minimum cost path tree;

the minimum cost path search determines the minimum cost path search has succeeded when:
  a candidate shortest path is identified, the candidate shortest path is identified when the least cost branch of the current search direction tree meets a leave node of the plurality of leave nodes of the opposite search direction tree, a concatenated path is identified, the concatenated path comprises the least cost branch of the current search direction tree and a branch of the opposite search direction tree comprising the leave node, and the candidate shortest path comprises the concatenated path if the concatenated path is the first one identified, if the concatenated path is not the first one identified, the candidate shortest path is replaced by the concatenated path if the concatenated path is less expensive than the candidate shortest path, and
  the candidate shortest path is determined to be the shortest path, the candidate shortest path is determined to be the shortest path when the candidate shortest path is identified and the leave node list is exhausted or if the leave node list is not exhausted, the candidate shortest path is determined to be the shortest path when the candidate shortest path is not more expensive than a virtual minimum cost path, wherein determining which of the candidate shortest path and the virtual minimum cost path is more expensive comprises:
    calculating a total path cost of the virtual minimum cost path by adding the least path cost of the least cost branch of the current search direction tree and the least path cost of the least cost branch of the opposite search direction tree,
    calculating a number of total path hops of the virtual minimum cost path by adding the number of least path hops of the least cost branch of the current search direction tree and the number of least path hops of the least cost branch of the opposite search direction tree,
    calculating a candidate path cost and candidate path hops for the candidate shortest paths,
    comparing the total path cost and the number of total path hops of the virtual minimum cost path with the candidate path cost and candidate path hops of the candidate shortest path; and
    determining the candidate shortest path is not more expensive than the virtual minimum cost path if the total path cost of the virtual minimum cost path is greater than the candidate path cost, or the total path cost of the virtual minimum cost path is equal to the candidate path cost and the number of total path hops of the virtual minimum cost path is greater than the candidate path hops.

4. The method of claim 3, wherein determining the minimum cost path search has failed comprises determining the source node and destination node are not connected by determining the leave node list of the current search direction tree is exhausted and the candidate shortest path was not identified.

5. The method of claim 3, wherein the minimum hop path search has failed comprises determining the source node and destination node are not connected by determining the leave nodes of one of the forward minimum hop path tree and backward minimum hop path tree have been looked up and no path linking the source node and the destination node was found.

6. The method of claim 3, the minimum hop path search has succeeded comprises determining a leave node of one of the forward minimum hop path tree and backward minimum hop path tree meets a leave node of the other of the forward minimum hop path tree and backward minimum hop path tree.

7. A method of determining a minimum cost path extending from a source node of a plurality of nodes to a destination node of the plurality of nodes, wherein each node of the plurality of nodes is linked to another node of the plurality of nodes by a link having a link cost, and the minimum cost path extends from the source node to the destination node over the links connecting the nodes, the method comprising:
  creating a forward leave node list comprising the source node;
  creating a backward leave node list comprising the destination node;
  creating a forward search tree comprising a root node having a current node path cost and setting the root node equal to the source node;
  creating a backward search tree comprising a root node having a current node path cost and setting the root node equal to the destination node;
  initializing a candidate minimum cost path cost by setting the candidate minimum cost path cost equal to a predetermined value;
  initializing a candidate minimum cost path;
  selecting one of the forward leave node list and backward leave node list as the selected list, the other of the forward leave node list and backward leave node list being an unselected list;
  selecting a searching node from the selected list;
  until a termination condition is satisfied:
    i. if the selected list is the forward leave node list, the selected search tree is the forward search tree and the unselected search tree is the backward search tree, otherwise, the selected tree is the backward search tree and the unselected search tree is the forward search tree;
    ii. for each node of the plurality of nodes linked to the searching node,
      a. selecting the node as the searched node;
      b. determining whether the searched node is linked to the selected search tree;
      c. if the searched node is not linked to the selected search tree, linking the searched node to the selected search tree with a tree link linking the searched node to the searching node, and assigning a current node path cost to the searched node, the current node path cost being equal to the sum of the current node path cost of the searching node and the link cost between the searched node and searching node;
      d. if the searched node is linked to the selected search tree and the searched node is not located on a path connecting the root node and the searching node, determining a node path cost for the searched node by summing the current node path cost of the searching node and the link cost between the searching node and searched node, and comparing the node path cost with the current node path cost of the searched node, if the node path cost is less than the current node path cost of the searched node removing the tree link connecting the searched node to the selected tree, linking the searched node to the searching node on the selected search tree with a tree link, and setting the current node path cost of the searched node equal to the node path cost; and e. searching the unselected search tree to determine whether the searched node is linked to the unselected search tree, if the searched node is linked to the unselected search tree, determine a concatenated path cost by adding the current node path cost of the searched node in the selected search tree to the current node path cost of the searched node in the unselected search tree, and compare the concatenated path cost to the candidate minimum cost path cost, if the concatenated path cost is less than the candidate minimum cost path cost, set the candidate minimum cost path cost equal to the concatenated path cost and set the candidate minimum cost path equal to a concatenated path comprising a path from the root node of the selected search tree to the searched node and a path from the root node of the unselected search tree to the searched node;

f. adding the searched node to the selected list;

iii. removing the searching node from the selected list;

iv. if the selected list is the forward leave node list, select the backward leave node list as the selected list and the forward leave node list as the unselected list, otherwise, select the forward leave node list as the selected list and the backward leave node list as the unselected list; and v. if the selected list includes at least one node, selecting the searching node from the selected list, otherwise determining the termination condition is satisfied; and determining the minimum cost path is the candidate minimum cost path or the minimum cost path does not exist.

8. The method of claim 7, wherein the selected tree comprises at least one end node, each end node being linked by a tree link to a single node of the selected tree, and the unselected tree comprises at least one end node, each end node being linked by a tree link to a single node of the unselected tree, the method further comprising:

determining a virtual path cost by totaling the current node path cost of the end node of the selected tree having the lowest current node path cost and the current node path cost of the end node of the unselected tree having the lowest current node path cost; and comparing the virtual path cost and the candidate path cost and determining the termination condition is satisfied if the candidate path cost is less than the virtual path cost.

9. The method of claim 7, wherein the selected tree comprises at least one end node, each end node being linked by a tree link to a single node of the selected tree, and the unselected tree comprises at least one end node, each end node being linked by a tree link to a single node of the unselected tree, the method further comprising:

determining a virtual path cost by totaling the current node path cost of the end node of the selected tree having the lowest current node path cost and the current node path cost of the end node of the unselected tree having the lowest current node path cost; and comparing the virtual path cost and the candidate path cost and if the candidate path cost is equal to the virtual path cost, determining a number of virtual path hops by adding the number of tree links linking the end node of the selected tree having the lowest current node path cost to the root node of the selected tree and the number of tree links linking the end node of the unselected tree having the lowest current node path cost to the root node of the unselected tree;

determining a number of candidate path hops by adding the tree links linking the source node to the destination node along the candidate minimum cost path; and comparing the number of virtual path hops to the number of candidate path hops and determining the termination condition is satisfied if the number of candidate path hops is less than or equal to the number of virtual path hops.

10. The method of claim 7, wherein determining the minimum cost path does not exist comprises determining the candidate minimum cost path cost equals the predetermined value and determining the minimum cost path is the candidate minimum cost path comprises determining the candidate minimum cost path cost does not equal the predetermined value.

11. The method of claim 7, wherein the selected list is sorted by the current node path cost of each of the nodes of the selected list.

12. A method of determining a minimum hop path extending from a source node of a plurality of nodes to a destination node of the plurality of nodes, wherein each node of the plurality of nodes is linked to at least one other node of the plurality of nodes by a link, and the minimum hop path extends from the source node to the destination node over the links connecting the nodes of the plurality of nodes, the method comprising:

creating a forward searching node list comprising the source node;

creating a forward searched node list;

creating a backward searching node list comprising the destination node;

creating a backward searched node list;

creating a forward search tree comprising a root node and setting the root node equal to the source node;

creating a backward search tree comprising a root node and setting the root node equal to the destination node;

selecting one of the forward searching node list and backward searching node list as the selected list, the other of the forward searching node list and backward searching node list being an unselected list;

selecting a searching node from the selected list;

until a termination condition is satisfied:

a. if the selected list is the forward searching node list, the selected search tree is the forward search tree and the unselected search tree is the backward search tree, otherwise, the selected search tree is the backward search tree and the unselected search tree is the forward search tree;

b. if the selected list is the forward searching node list, the selected searched node list is the forward searched node list and the unselected searched node list is the backward searched node list, otherwise, the selected searched node list is the backward searched node list and the unselected searched node list is the forward searched node list;

c. for each node of the selected list, select a searching node from the selected searching node list, i. for each node of the plurality of nodes linked to the searching node, selecting the node as the searched node; and if the searched node is not linked to the selected search tree, linking the searched node to the selected search tree with a tree link by linking the searched node to the searching node with the tree link; and searching the unselected search tree to determine whether the searched node is linked to the unselected search tree, if the searched node is linked to the unselected search tree, identifying a minimum hop path comprising a path from the root node of the selected search tree to the searched node and a path from the root node of the unselected search tree to the searched node, and determining the termination condition is satisfied, otherwise, adding the searched node to the selected searched node list, and ii. removing the searching node from the selected list;

d. swapping the nodes of the selected list and the selected searched node list;

e. if the selected searched node list is the forward searched node list, select the backward searching node list as the selected list and the forward searching node list as the unselected list, otherwise, select the forward searching node list as the selected list and the backward searching node list as the unselected list; and f. if the selected list includes at least one node, selecting the searching node from the selected list, otherwise determining the termination condition is satisfied.

13. The method of claim 12, further comprising, if the termination condition is satisfied and the minimum hop path was not identified, determining the minimum hop path does not exist.

14. A method of determining a minimum cost path extending from a source node of a plurality of nodes to a destination node of the plurality of nodes, wherein each node of the plurality of nodes is linked to at least one other node of the plurality of nodes by a link having a link cost, and the minimum cost path extends from the source node to the destination node over the links connecting the nodes, the method comprising:

creating a forward leave node list comprising the source node;

creating a backward leave node list comprising the destination node;

creating a forward search tree comprising a root node having a current node path cost and setting the root node equal to the source node;

creating a backward search tree comprising a root node having a current node path cost and setting the root node equal to the destination node;

initializing a candidate minimum cost path cost by setting the candidate minimum cost path cost equal to a predetermined value;

initializing a candidate minimum cost path;

determining the minimum cost path is the candidate minimum cost path or the minimum cost path does not exist by conducting a forward search and a backward search until a termination condition is satisfied, wherein the forward search comprises:

a. if the forward leave node list includes at least one node, selecting the forward searching node from the forward leave node list, otherwise determining the termination condition is satisfied;

b. for each node of the plurality of nodes linked to the forward searching node, i. selecting the node as the forward searched node;

ii. determining whether the forward searched node is linked to the forward search tree;

iii. if the forward searched node is not linked to the forward search tree, linking the forward searched node to the forward search tree with a tree link linking the forward searched node to the forward searching node and assigning a current node path cost to the forward searched node, the current node path cost being equal to the sum of the current node path cost of the forward searching node and the link cost between the forward searched node and forward searching node;

iv. if the forward searched node is linked to the forward search tree and the forward searched node is not located on a path connecting the root node and the forward searching node, determining a node path cost for the forward searched node by summing the current node path cost of the forward searching node and the link cost between the forward searching node and forward searched node, and comparing the node path cost with the current node path cost of the forward searched node, if the node path cost is less than the current node path cost, removing the tree link connecting the forward searched node to the forward search tree, linking the forward searched node to the forward searching node with a tree link, and setting the current node path cost of the forward searched node equal to the node path cost;

v. searching the backward search tree to determine whether the forward searched node is linked to the backward search tree, if the forward searched node is linked to the backward search tree, determine a concatenated path cost by adding the current node path cost of the forward searched node in the forward search tree to the current node path cost of the forward searched node in the backward search tree, and compare the concatenated path cost to the candidate minimum cost path cost, if the concatenated path cost is less than the candidate minimum cost path cost, setting the candidate minimum cost path cost equal to the concatenated path cost and set the candidate minimum cost path equal to a concatenated path comprising a forward path from the root node of the forward search tree to the forward searched node and a backward path from the root node of the backward search tree to the forward searched node; and vi. adding the forward searched node to the forward leave node list; and c. removing the forward searching node from the forward leave node list;

the backward search comprises:

a. if the backward leave node list includes at least one node, selecting the backward searching node from the backward leave node list, otherwise determining the termination condition is satisfied;

b. for each node of the plurality of nodes linked to the backward searching node, i. selecting the node as the backward searched node;

ii. determining whether the backward searched node is linked to the backward search tree;

iii. if the backward searched node is not linked to the backward search tree, linking the backward searched node to the backward search tree with a tree link linking the backward searched node to the backward searching node, and assigning a current node path cost to the backward searched node, the current node path cost being equal to the sum of the current node path cost of the forward searching node and the link cost between the backward searched node and backward searching node;

iv. if the backward searched node is linked to the backward search tree and the backward searched node is not located on a path connecting the root node and the backward searching node, determining a node path cost for the backward searched node by summing the current node path cost of the backward searching node and the link cost between the backward searching node and backward searched node, and comparing the node path cost with the current node path cost of the backward searched node, if the node path cost is less than the current node path cost, removing the tree link connecting the backward searched node to the backward search tree, adding a tree link between the backward searching node and backward searched node, and setting the current node path cost of the backward searched node equal to the node path cost;

v. searching the forward search tree to determine whether the backward searched node is linked to the forward search tree, if the backward searched node is linked to the forward search tree, determine a concatenated path cost by adding the current node path cost of the backward searched node in the backward search tree to the current node path cost of the backward searched node in the forward search tree, and compare the concatenated path cost to the candidate minimum cost path cost, if the concatenated path cost is less than the candidate minimum cost path cost, setting the candidate minimum cost path cost equal to the concatenated path cost and set the candidate minimum cost path equal to a concatenated path comprising a forward path from the root node of the forward search tree to the backward searched node and a backward path from the root node of the backward search tree to the backward searched node; and vi. adding the backward searched node to the backward leave node list;

c. removing the backward searching node from the backward leave node list.

15. The method of claim 14, wherein the forward search and backward search are conducted simultaneously.

16. The method of claim 14, wherein the forward search is conducted by a first processor running a forward thread, backward search is conducted by a second processor running a second thread, and the first and second processors run the first and second threads simultaneously.

17. The method of claim 14, wherein the forward search and backward search are conducted one at a time.

18. The method of claim 14, wherein the forward search is conducted by a processor, backward search is conducted by the processor, and the processor alternates between the forward and backward search until the termination condition is satisfied.

19. The method of claim 14, wherein the forward search tree comprises at least one end node, each end node being linked by a tree link to a single node of the forward search tree, and the backward search tree comprises at least one end node, each end node being linked by a tree link to a single node of the backward search tree, the method further comprising:

determining a virtual path cost by totaling the current node path cost of the end node of the forward search tree having the lowest current node path cost and the current node path cost of the end node of the backward search tree having the lowest current node path cost; and comparing the virtual path cost and the candidate path cost and if the candidate path cost is less than the virtual path cost, determining the termination condition is satisfied.

20. The method of claim 14, wherein the forward search tree comprises at least one end node, each end node being linked by a tree link to a single node of the forward search tree, and the backward search tree comprises at least one end node, each end node being linked by a tree link to a single node of the backward search tree, the method further comprising:

determining a virtual path cost by totaling the current node path cost of the end node of the forward search tree having the lowest current node path cost and the current node path cost of the end node of the backward search tree having the lowest current node path cost; and comparing the virtual path cost and the candidate path cost and if the candidate path cost is equal to the virtual path cost:

determining a number of virtual path hops by adding the number of tree links linking the end node of the forward search tree having the lowest current node path cost to the root node of the forward search tree and the number of tree links linking the end node of the backward search tree having the lowest current node path cost to the root node of the backward search tree;

determining a number of candidate path hops by adding the tree links linking the source node to the destination node along the candidate minimum cost path; and comparing the number of virtual path hops to the number of candidate path hops and if the number of candidate path hops is less than or equal to the number of virtual path hops, determining the termination condition is satisfied.

21. The method of claim 14, wherein determining the minimum cost path does not exist comprises determining the candidate minimum cost path cost equals the predetermined value and determining the minimum cost path is the candidate minimum cost path comprises determining the candidate minimum cost path cost does not equal the predetermined value.

22. The method of claim 14, wherein the forward leave node list is sorted by the current node path cost of each of the nodes of the forward leave node list.

23. The method of claim 14, wherein the backward leave node list is sorted by the current node path cost of each of the nodes of the backward leave node list.

24. A method of determining a minimum hop path extending from a source node of a plurality of nodes to a destination node of the plurality of nodes, wherein each node of the plurality of nodes is linked to at least one other node of the plurality of nodes by a link, and the minimum hop path extends from the source node to the destination node over the links connecting the nodes of the plurality of nodes, the method comprising:

creating a forward searching node list comprising the source node;

creating a forward searched node list;

creating a backward searching node list comprising the destination node;

creating a backward searched node list;

creating a forward search tree comprising a root node and setting the root node equal to the source node;

creating a backward search tree comprising a root node and setting the root node equal to the destination node;

determining the minimum hop path is a concatenated path or the minimum hop path does not exist by conducting a forward search and a backward search until a termination condition is satisfied, wherein the forward search comprises:
- a. if the forward searching node list includes at least one node, selecting the forward searching node from the forward searching node list, otherwise determining the termination condition is satisfied;
- b. for each node of the forward searching node list, selecting a forward searching node by selecting the node from the forward searching node list,
  - i. for each node of the plurality of nodes linked to the forward searching node, selecting a forward searched node by selecting the node, and if the forward searched node is not linked to the forward search tree, linking the forward searched node to the forward search tree with a tree link and searching the backward search tree to determine whether the forward searched node is linked to the backward search tree,
  if the forward searched node is linked to the backward search tree, determining the concatenated path by concatenating a forward path from the root node of the forward search tree to the forward searched node and a backward path from the root node of the backward search tree to the forward searched node, and determining the termination condition is satisfied, otherwise adding the forward searched node to the forward searched node list; and
  - ii. removing the forward searching node from the forward searching node list; and
- c. swapping the nodes of the forward searching node list and the forward searched node list; and the backward search comprises:
- a. if the backward searching node list includes at least one node, selecting the backward searching node from the backward searching node list, otherwise determining the termination condition is satisfied;
- b. for each node of the backward searching node list, selecting a backward searching node by selecting the node from the backward searching node list,
  - i. for each node of the plurality of nodes linked to the backward searching node, selecting a backward searched node by selecting the node, if the backward searched node is not linked to the backward search tree, linking the backward searched node to the backward search tree with a tree link and searching the forward search tree to determine whether the backward searched node is linked to the forward search tree,
  if the backward searched node is linked to the forward search tree, determining the concatenated path by concatenating a backward path from the root node of the backward search tree to the backward searched node and a forward path from the root node of the forward search tree to the backward searched node, and determining the termination condition is satisfied, otherwise adding the backward searched node to the backward searched node list; and
  - ii. removing the backward searching node from the backward searching node list; and
- c. swapping the nodes of the backward searching node list and the backward searched node list.

25. The method of claim 24, wherein the forward search and backward search are conducted simultaneously.

26. The method of claim 24, wherein the forward search is conducted by a first processor running a first thread, backward search is conducted by a second processor running a second thread, and the first and second processors run the first and second threads simultaneously.

27. The method of claim 24, wherein the forward search and backward search are conducted one at a time.

28. The method of claim 24, wherein the forward search is conducted by a processor, backward search is conducted by the processor, and the processor alternates between the forward and backward search until the termination condition is satisfied.

* * * * *